US008238236B2

(12) United States Patent
Kim et al.

(10) Patent No.: US 8,238,236 B2
(45) Date of Patent: Aug. 7, 2012

(54) METHOD FOR REPORTING RECEPTION RESULT OF PACKETS IN MOBILE COMMUNICATION SYSTEM

(75) Inventors: Young-Soo Kim, Seoul (KR); Kyung-Hun Jang, Suwon-si (KR); Dong-Jun Lee, Seoul (KR); Jung-Hoon Suh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 757 days.

(21) Appl. No.: 11/442,749

(22) Filed: May 30, 2006

(65) Prior Publication Data
US 2007/0011504 A1    Jan. 11, 2007

(30) Foreign Application Priority Data

May 31, 2005    (KR) .................. 10-2005-0046277

(51) Int. Cl.
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ..... 370/230; 370/231; 370/235; 370/395.5; 370/395.54

(58) Field of Classification Search .......... 709/237; 371/32, 33; 370/230, 230.1, 231, 235, 237, 370/310, 351, 395.5, 395.54
See application file for complete search history.

(56) References Cited

U.S. PATENT DOCUMENTS

| 5,440,545 | A | * | 8/1995 | Buchholz et al. ............. 370/426 |
| 5,553,083 | A | * | 9/1996 | Miller ........................... 714/748 |
| 6,285,665 | B1 | * | 9/2001 | Chuah .......................... 370/319 |
| 6,381,215 | B1 | * | 4/2002 | Hamilton et al. ............. 370/236 |
| 6,496,481 | B1 | * | 12/2002 | Wu et al. ...................... 370/242 |
| 6,658,619 | B1 |  | 12/2003 | Chen |
| 6,975,647 | B2 | * | 12/2005 | Neale et al. ................... 370/466 |

(Continued)

FOREIGN PATENT DOCUMENTS

KR    10-2002-0093543    12/2002

(Continued)

OTHER PUBLICATIONS

IEEE 802.11e/D5.0, "Medium Access Control (MAC) Enhancements for Quality of Service (QoS)", Jul. 2003, IEEE, all pages.*

(Continued)

*Primary Examiner* — Steven H Nguyen
*Assistant Examiner* — Adam Duda
(74) *Attorney, Agent, or Firm* — NSIP Law

(57) ABSTRACT

Disclosed is a method for configuring a bitmap in a mobile communication system employing a block ACK scheme, which faithfully performs its intrinsic function of acknowledging a reception result, and yet can reduce transmission delay and the overall system load due to retransmission in the case where packet loss is relatively less important than transmission delay time, such as in the case of voice communication. To this end, a recipient compares a PER of a received packet signal with a threshold value. If the PER is higher than the threshold value, the recipient operates in the block ACK scheme, and if the PER is lower than the threshold value, the recipient determines a bitmap configuration scheme on the assumption that an erroneous frame has been successfully received. Also, using the determined bitmap configuration scheme, the recipient transmits a reception result for each received packet.

14 Claims, 9 Drawing Sheets

U.S. PATENT DOCUMENTS

| | | | |
|---|---|---|---|
| 2002/0036992 A1* | 3/2002 | Balachandran et al. | 370/329 |
| 2003/0135640 A1* | 7/2003 | Ho et al. | 709/237 |
| 2006/0034277 A1* | 2/2006 | Jang et al. | 370/389 |
| 2007/0127424 A1* | 6/2007 | Kwon et al. | 370/338 |

FOREIGN PATENT DOCUMENTS

| | | | |
|---|---|---|---|
| WO | WO 2004/030266 | * | 4/2004 |

OTHER PUBLICATIONS

Choi, "IEEE 802.11e Contention-Based Channel Access (EDCF) Performance Evaluation", 2003, IEEE, all pages.*

Mangold, "IEEE 802.11e Wireless LAN for Quality of Service", Feb. 2002, Proc. European Wireless, Florence, Italy, all pages.*

Brown, "Block Acknowledgement: Redesigning the Window Protocol", 1989, ACM, all pages.*

Molisch, "PHY and MAC Proposal for IEEE 802.11n", Sep. 2004, IEEE, all slides.*

Ericsson, Protecting Distortion TOlerant Data by Automatic Repeat Request (ARQ), Dec. 1996, IBM Technical Disclosure Bulletin, all pages.*

European Office Action issued on Oct. 13, 2010, in corresponding European Patent Application No. 06 011 304.0 (9 pages).

Daneshmand et al., "Framework and Requirements of Quality of Service for Multimedia Applications," *In Proceedings of the Intelligent Information Systems*, 1997 (*IIS '97*), Dec. 8, 1997, IEEE Computing Society, Los Alamitos, CA, USA, pp. 466-474.

Korean Decision on Grant issued Nov. 7, 2011, in counterpart Korean Application No. 10-2005-0046277 (5pp).

* cited by examiner

| ORDER | INFORMATION |
|---|---|
| 1 | CATEGORY (=1) |
| 2 | ACTION (=0) |
| 3 | DIALOG TOKEN |
| 4 | TSPEC |
| 5 - n | TCLAS (OPTIONAL) |
| n + 1 | TCLAS PROCESSING (OPTIONAL) |

FIG. 2

| ORDER | INFORMATION |
|---|---|
| 1 | CATEGORY (=1) |
| 2 | ACTION (=1) |
| 3 | DIALOG TOKEN |
| 4 | STATUS CODE |
| 5 | TS DELAY |
| 6 | TSPEC |
| 7 - n | TCLAS (OPTIONAL) |
| n + 1 | TCLAS PROCESSING (OPTIONAL) |
| n + 2 | SCHEDULE |

FIG. 3

METHOD FOR REPORTING RECEPTION RESULT OF PACKETS IN MOBILE COMMUNICATION SYSTEM

PRIORITY

This application claims priority to applications entitled "Method for Reporting Reception Result of Packets in Mobile Communication System" filed in the Korean Industrial Property Office on May 31, 2005, and assigned Serial No. 2005-46277, the contents of which are incorporated herein by reference.

BACKGROUND OF THE INVENTION

Field of the Invention

The present invention relates to a bitmap structure for reporting a reception result of packets by applying a retransmission technique and a method for reporting the reception result in a mobile communication system.

In general, a radio channel can cause errors in transmitted packets under the influence of multi-path fading, interference among users, noise and so forth. A solution to this problem includes a Forward Error Correction Code (FEC) scheme in which the probability of error occurrence is lowered by additionally sending redundant information, an Automatic Repeat Request (ARQ) scheme in which, when errors occur, retransmission of packets where the errors have occurred is requested, and a Hybrid Automatic Retransmission Request (HARQ) scheme which combines both the schemes.

In the ARQ scheme, an ACK (Acknowledgment)/NACK (Not Acknowledgment) signal is used for notifying a transmitter of whether or not received packets are erroneous. The ACK signal confirms to the transmitter that a receiver has succeeded in receiving the corresponding packets, and the NACK signal confirms the transmitter that the receiver has failed in receiving the corresponding packets. If the transmitter receives the NACK signal, it retransmits the corresponding packets to the receiver. In the ARQ scheme, a reception result is normally acknowledged on a packet-by-packet basis.

In addition to such a normal ACK scheme in which a reception result is reported on a packet-by-packet basis, the ARQ scheme further includes a block ACK scheme in which reception results of plural transmitted packets are acknowledged in a lump through a block ACK message. By applying this block ACK scheme, the efficiency of a network can be enhanced.

The block ACK scheme is classified into two types, that is, an immediate block ACK scheme and a delayed block ACK scheme, according to use. In the immediate block ARQ scheme, which is suitable to apply to traffic having high bandwidth and small transmission delay time, a receiver immediately transmits a block ACK frame to a transmitter in response to a block ACK request.

In the delayed ACK scheme, which is applied to traffic insensitive to transmission delay time, a receiver transmits an ACK signal to a transmitter in response to a block ACK request, and transmits a block ACK to the transmitter when the receiver gets an opportunity to transmit the block ACK later on.

Research is currently being pursued to support voice communication using a VoIP service by providing handheld devices with a module supporting a WLAN. The first consideration in this research is the transmission delay time.

Usually, the VoIP service is a typical service required to be provided in real time. Thus, the transmission delay time must be minimized. In the VoIP service, however, if reception results are acknowledged using the above-mentioned conventional block ACK scheme, speech quality deteriorates and transmission delay time increases.

SUMMARY OF THE INVENTION

Accordingly, the present invention has been made to solve at least the above-mentioned problems occurring in the prior art, and an object of the present invention is to provide a method for variably adjusting a message, through which reception result information is transmitted, according to traffic types.

It is a further object of the present invention to provide a method for flexibly adjusting a bitmap configuration, which is to be transmitted to an originator in response to a block ACK request from the originator, according to the traffic characteristics.

It is a further object of the present invention to provide a method for configuring a bitmap in a mobile communication system, which faithfully performs its intrinsic function of acknowledging a reception result, and yet can reduce transmission delay and the overall system load due to retransmission in the case where packet loss is relatively less important than transmission delay time, such as in the case of voice communication.

It is a further object of the present invention to provide a method for reducing the number of times of retransmission by preparing a bitmap on the assumption that lost packets have been successfully received within a range satisfying conditions required by a user, and informing the transmitter of the prepared bitmap.

It is a further object of the present invention to provide a method for reporting a reception result of packets in a mobile communication system, which exhibits good performance even when errors consecutively occur on the basis of an interval between frames where the errors have occurred.

In order to accomplish these objects, in accordance with an aspect of the present invention, there is provided a method for configuring a bitmap based on a reception result for each of received data frames in a mobile communication system, the method including comparing a packet error rate, which is caused by a received data frame, with a predetermined threshold value; and if the packet error rate is lower than the predetermined threshold value, configuring the bitmap assuming that the received data frame has been successfully received.

In order to accomplish the above-mentioned objects, in accordance with another aspect of the present invention, there is provided a method for reporting a reception result for each of received data frames by using a bitmap in a mobile communication system, the method including receiving data frames until a block ACK is requested; setting an identification bit of the bitmap, which corresponds to a data frame having been successfully received from among the received data frames, to a positive value; calculating a current packet error rate caused by a data frame having been unsuccessfully received from among the received data frames; if the packet error rate is lower than a predetermined threshold value, setting a corresponding identification bit of the bitmap to a positive value; if the current packet error rate is greater than or equal to the predetermined threshold value, setting the corresponding identification bit of the bitmap to a negative value; and if the setting of the identification bit is completed for the respective received data frames, transmitting the bitmap through a block ACK message.

In order to accomplish the above-mentioned objects, in accordance with another aspect of the present invention, there is provided a method for configuring a bitmap based on a reception result for each of received data frames in a mobile communication system, the method including checking an interval between a first data frame and a second data frame, which have not been successfully received; if the interval is within a predetermined interval, setting an identification bit of the bitmap, which corresponds to the second data frame, to a positive value; and if the interval is greater than or equal to the predetermined interval, setting the identification bit of the bitmap, which corresponds to the second data frame, to a negative value, wherein the first data frame is a data frame most adjacent to the second data frame, from among data frames having not been successfully received before the second data frame is received.

BRIEF DESCRIPTION OF THE DRAWINGS

The above and other objects, features and advantages of the present invention will be more apparent from the following detailed description taken in conjunction with the accompanying drawings, in which:

FIG. 2 is a view illustrating a frame structure for an Add Traffic Specification Request in the present invention;

FIG. 3 is a view illustrating a frame structure for an Add Traffic Specification Response in the present invention;

DETAILED DESCRIPTION OF THE PREFERRED EMBODIMENTS

Figure 1:
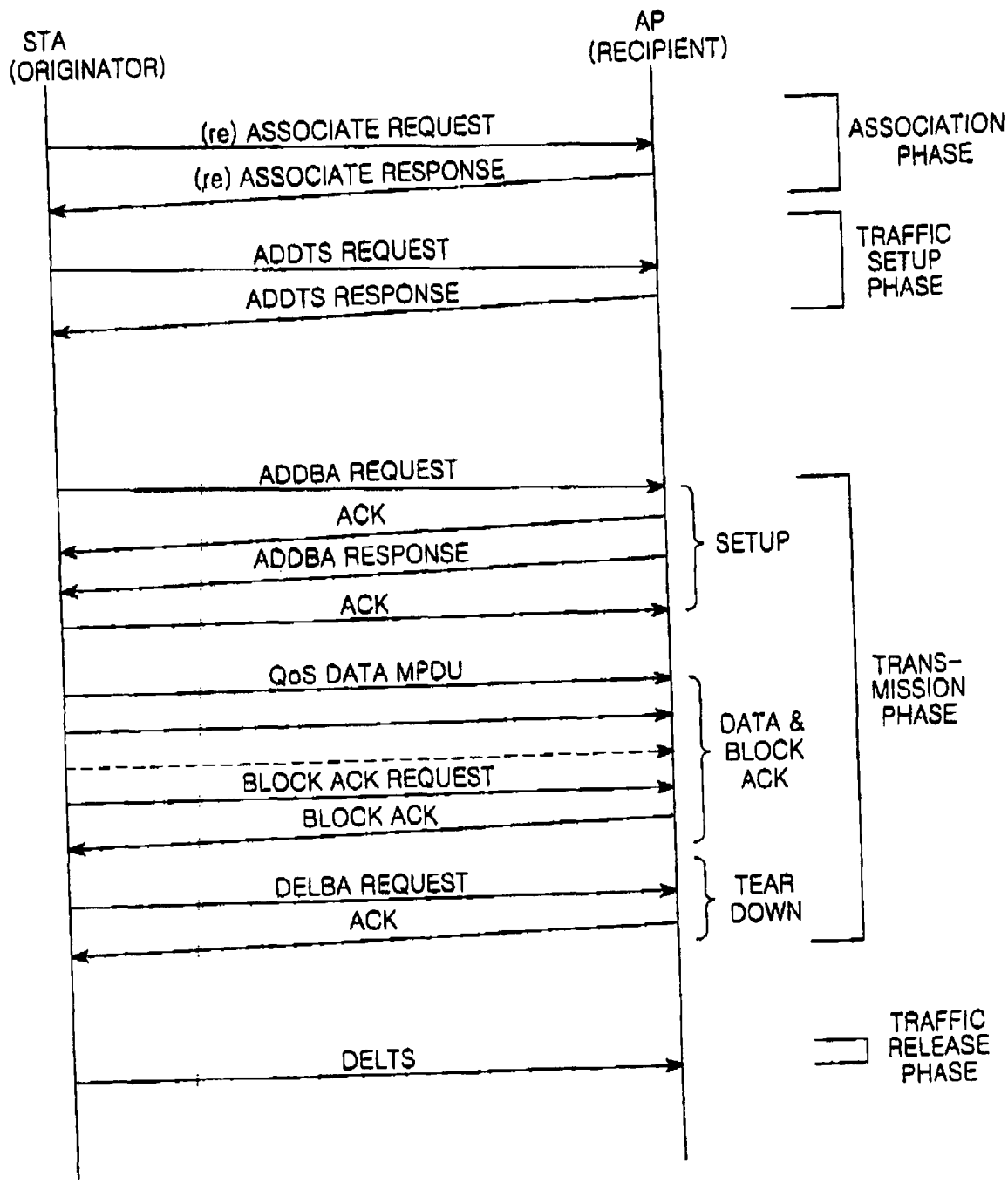
FIG. 1 is a view illustrating signaling in a mobile communication system to which the present invention is applied.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

Herein, one representative embodiment of the present invention for accomplishing the above-mentioned objects will be presented, and other embodiments, which may be presented in the present invention, will be substituted by a description of constructions of the present invention. Also, although a preferred embodiment is based on application to a VoIP service in the following description, it is obvious that the present invention may be applied to any other services required to be provided in real time.

The present invention provides a bitmap configuration method and a bitmap reporting method, which can reduce transmission delay and the overall system load due to retransmission in the case where packet loss is relatively less important than transmission delay time, such as in the case of voice communication, and can reduce unnecessary transmissions.

To this end, there must be provided a way to check service type, which an originator requests, in a recipient. In addition to this, there must be presented in detail a method for configuring a bitmap on the assumption that lost packets have been successfully received within a range satisfying conditions required by a user. At this time, the conditions required by a user must also be clearly defined.

A. Signaling

Hereinafter, signaling between an Access Point (AP) and a Station (STA) according to a preferred embodiment of the present invention will be described in detail.

A protocol providing QoS (Quality of Service) such as IEEE 802.11e system is required for providing a VoIP service in a mobile communication system. In the IEEE 802.11e system, it is common that QoS for traffic to be generated is negotiated between an AP and a STA. When such QoS traffic is transmitted, an efficient service can be provided using characteristics of the corresponding traffic.

FIG. 1 illustrates signaling for providing a requested service in a mobile communication system. In FIG. 1, it is assumed that an originator is a STA, and a recipient is an AP. Referring to FIG. 1, the signaling performed between the originator and the recipient includes an association phase, a traffic setup phase, a transmission phase, and a traffic release phase.

In the association phase, the STA transmits an association request to the AP and, in response to this, the AP transmits an association response to the STA. If the association phase is completed, the traffic setup phase is performed. In the traffic setup phase, the STA requests the AP to use corresponding traffic when each traffic is generated, and the AP grants the STA the use of the corresponding traffic. To this end, the STA transmits an Add Traffic Specification (hereinafter referred to as "ADDTS") request message to the AP. In response to this, the AP transmits an ADDTS response message to the STA. A structure of the ADDTS request message is illustrated in FIG. 2, and a structure of the ADDTS response message is illustrated in FIG. 3.

The ADDTS request and response messages include Traffic Specification (hereinafter referred to as "TSPEC") information. Service requirements for the corresponding traffic are defined in the TSPEC information. These service requirements are used to exchange information between the AP and the STA in the course of traffic negotiation, and mainly consist of parameters defining characteristics of QoS traffic. Particularly, in the present invention, information on traffic type must be included in the TSPEC information. This information on traffic type is used as a parameter determining whether to use a bitmap configuration method of the present invention. In the present invention, traffic type, for which a bitmap can be generated by the proposed bitmap configuration method, is limited to traffic types requiring a real-time service.

Figure 4:
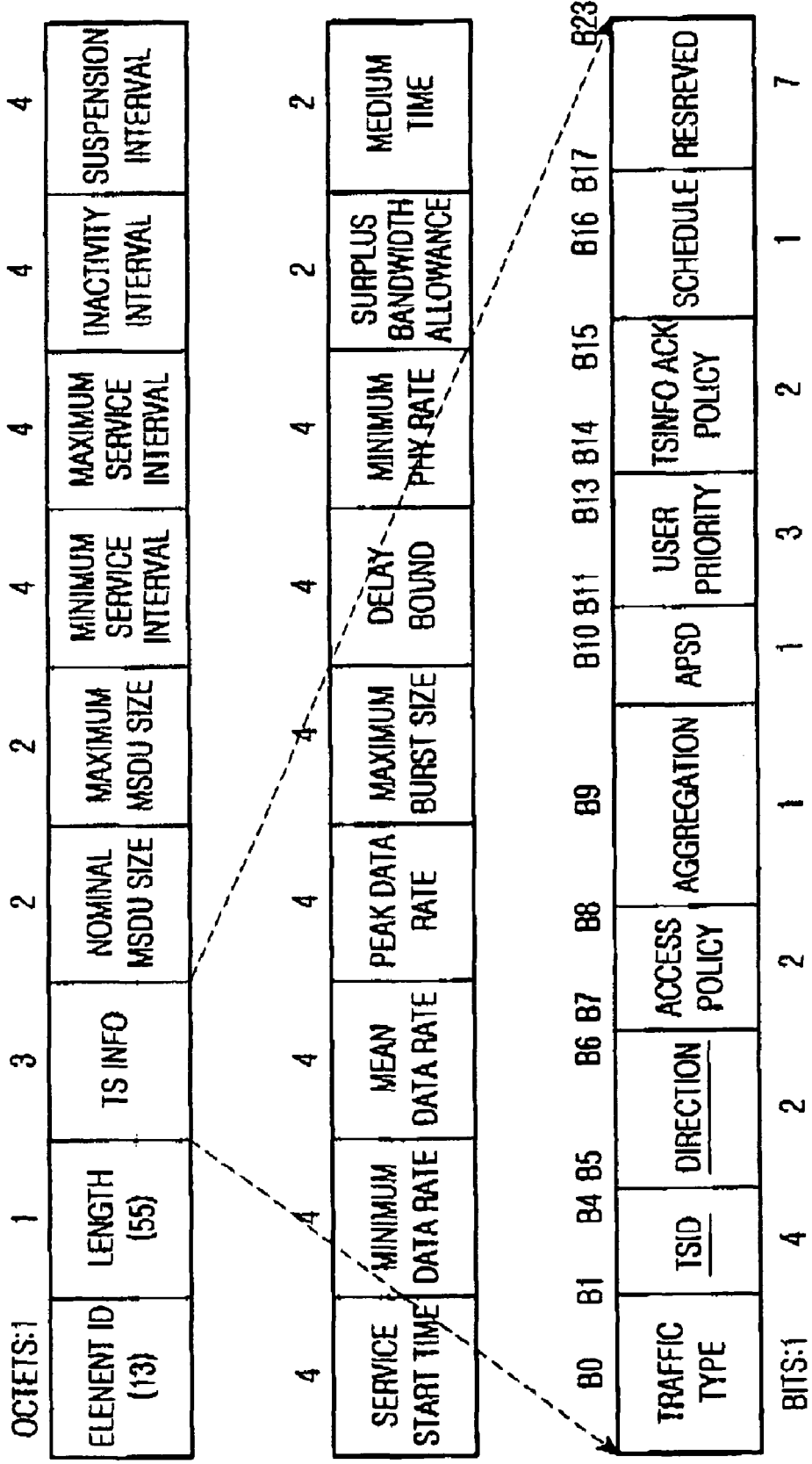
FIG. 4 is a view illustrating a detailed structure of TSPEC (Traffic Specification) information included in frames shown in FIGS. 2 and 3.

FIG. 4 illustrates the structure of a frame by which the TSPEC information is transmitted. In FIG. 4, information on requested traffic type is recorded in a TSID (Traffic Stream Identification) field. Thus, the AP can confirm traffic, which the STA requests, by checking the information on traffic type recorded in the TSID field. Through this, the AP can also determine a bitmap structure to be used. That is, when the STA requests traffic in which packet loss is less important than transmission delay, such as a voice service and so forth, the AP configures a bitmap capable of minimizing a retransmission request. In contrast with this, the existing bitmap is configured for other traffic.

If the traffic setup phase is completed in this way, the transmission phase is performed. The transmission phase includes a setup step, a data and block ACK step, and a teardown step.

In the setup step, the STA transmits an Add Traffic Block ACK (hereinafter referred to as "ADDBA") request message to the AP. The ADDBA request message is transmitted in order to inform a recipient to use a block ACK. The AP transmits an ACK to the STA according to the reception of the ADDBA request message. The AP then transmits an ADDBA response message to the STA in response to the ADDBA request message. The STA transmits an ACK to the AP according to the reception of the ADDBA response message.

In the data and block ACK step, the STA consecutively transmits a plurality of data frames to the AP. The number of the consecutively transmitted data frames may be prearranged between the AP and the STA.

Subsequently, the STA transmits a block ACK request message requesting the AP to report a reception result for the plurality of transmitted data frames. In the block ACK request message, a sequence number belonging to a data frame transmitted first from among the plurality of data frames is set to a starting sequence number.

If the block ACK message is received, the AP configures a bitmap based on a reception result of the consecutively transmitted data frames. In configuring the bitmap, the AP refers to the traffic type, which has been confirmed through the ADDTS request message. That is, the bitmap is configured differently according to traffic types. For example, in the case of a voice service, the AP configures the bitmap on the assumption that it succeeds in receiving data frames which, in actuality, have not been successfully received. This assumption must be made within a range satisfying conditions required by a user. The conditions which a user may require will be described later. The bitmap, which is configured in response to the block ACK request message, is transmitted to the STA through a block ACK message.

The STA checks the reception result of the previously transmitted data frames by means of the bitmap transmitted through the block ACK message. Based on the reception result, the STA determines whether to retransmit the previously transmitted data frames.

When all of data frames to be transmitted are finally transmitted, the STA performs the teardown step. In the teardown step, the STA transmits a DELBA (Delete Block Acknowledgment) request message informing the AP not to use the block ACK. The AP transmits an ACK to the STA according to the reception of the DELBA request message.

The STA releases the traffic granted thereto through the traffic release phase when traffic desired by the STA is completed. In the traffic release phase, the STA transmits a DELTS (Delete Traffic Stream) message to the AP.

As can be seen from the foregoing, in the present invention, a STA requests a desired traffic type to an AP through an ADDTS message, and the AP grants transmission using corresponding traffic to the STA. By this, the STA consecutively transmits data frames corresponding to the granted traffic, and then may request a block ACK to the AP. When the block ACK is requested, the AP configures an optimal bitmap corresponding to the previously provided traffic type, and then transmits the block ACK. Thus, the AP can configure an optimal bitmap corresponding to the granted traffic.

B. Operations For Configuring A Bitmap

Hereinafter, a detailed description will be given for a process of configuring a bitmap in a recipient in accordance with a preferred embodiment of the present invention.

In the present invention, a bitmap for a block ACK is adjusted according to a current Packet Error Rate (hereinafter referred to as "PER"). For example, when the current PER is higher than a threshold value, the bitmap is configured using the existing block ACK scheme to reduce frame loss. However, when the current PER is lower than the threshold value, the bitmap is configured on the assumption that an erroneous frame has been successfully received, to avoid inconveniencing the user.

Here, the threshold value as an adjustment basis is determined by a request parameter (QoS) of a service user. In order to prevent a case where errors consecutively occur, an interval between data frames where errors have occurred may also be set as the adjustment basis.

The current PER of a received data frame is calculated in a sliding window scheme. For example, the current PER is calculated by detecting an error during a current 20 msec period. Also, an interval between data frames where errors have occurred most lately is monitored, which makes it possible to flexibly operate even when errors consecutively occur.

As stated above, in the present invention, operations for configuring a bitmap follow a normal block ACK scheme (the existing block ACK scheme) when the current PER is higher than the threshold value. However, when the current PER is lower than the threshold value, the bitmap for a block ACK is adaptively adjusted according to circumstances, and the bitmap is configured on the assumption that an unsuccessfully received frame has been successfully received.

Hereinafter, a recipient's operations for configuring a bitmap according to the present invention will be described in detail. In the following description, it is assumed that a recipient is an AP, and an originator is a STA. Also, it is assumed that the originator requests service type, in which packet loss is relatively less important than transmission time, such as a voice service and the like.

Figure 5:
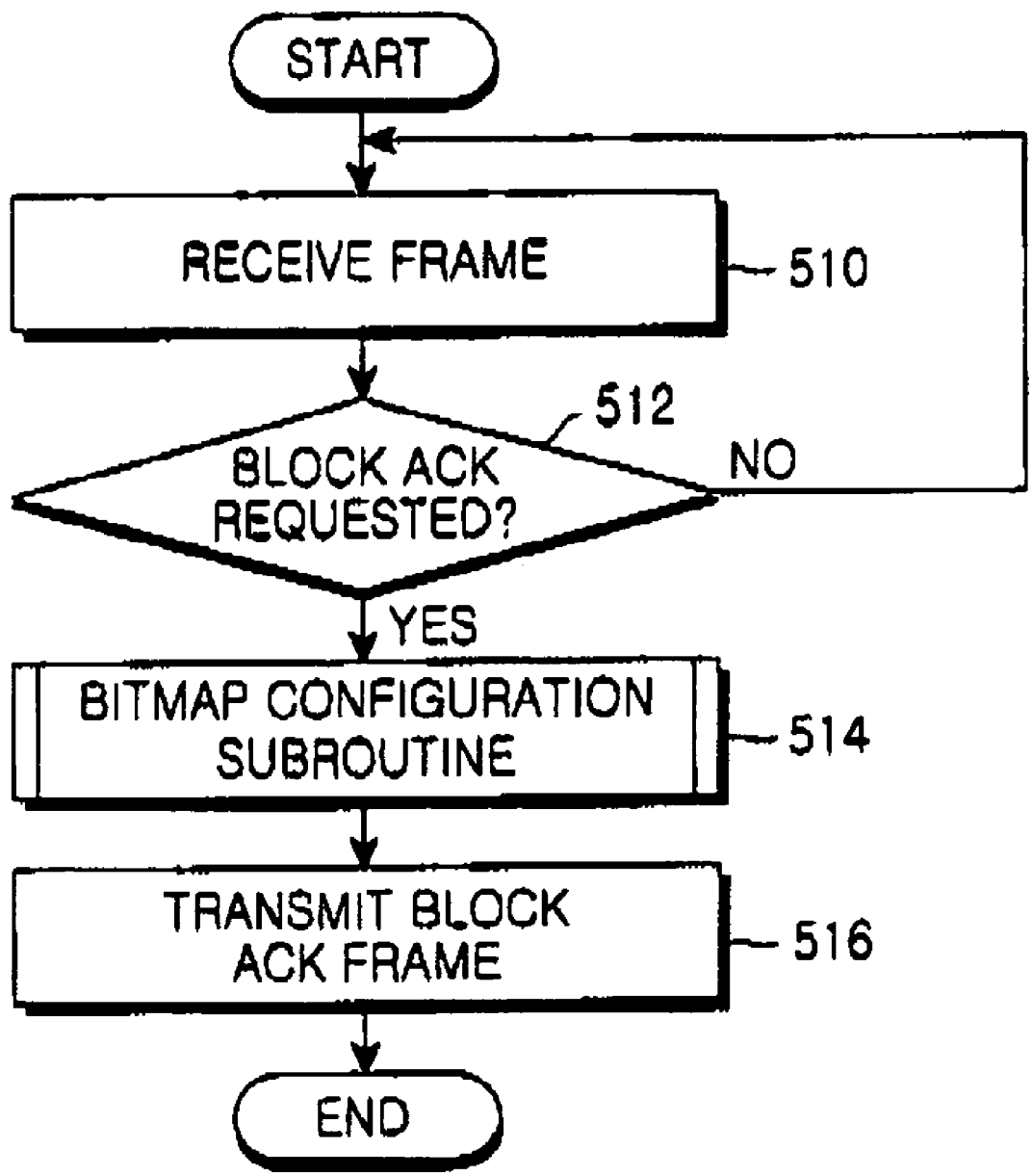
FIG. 5 is a flowchart illustrating a control flow for generating a block ACK bitmap in accordance with a first embodiment of the present invention.

FIG. 5 illustrates a control flow in an AP according to the present invention, in which a bitmap is configured at a point of time when a block ACK is requested.

Referring to FIG. 5, the AP receives data frames, which are consecutively transmitted, until the STA requests a block ACK (step 510, step 512). In step 512, if the AP receives the block ACK request from the STA, it goes to step 514 to perform a subroutine for configuring a bitmap. In the subroutine for configuring a bitmap, the bitmap is configured on the assumption that lost packets have been successfully received within a range satisfying conditions required by a user. Specific operational examples for the bitmap configuration subroutine will be described below with reference to FIGS. 6, 7 and 8.

Figure 6:
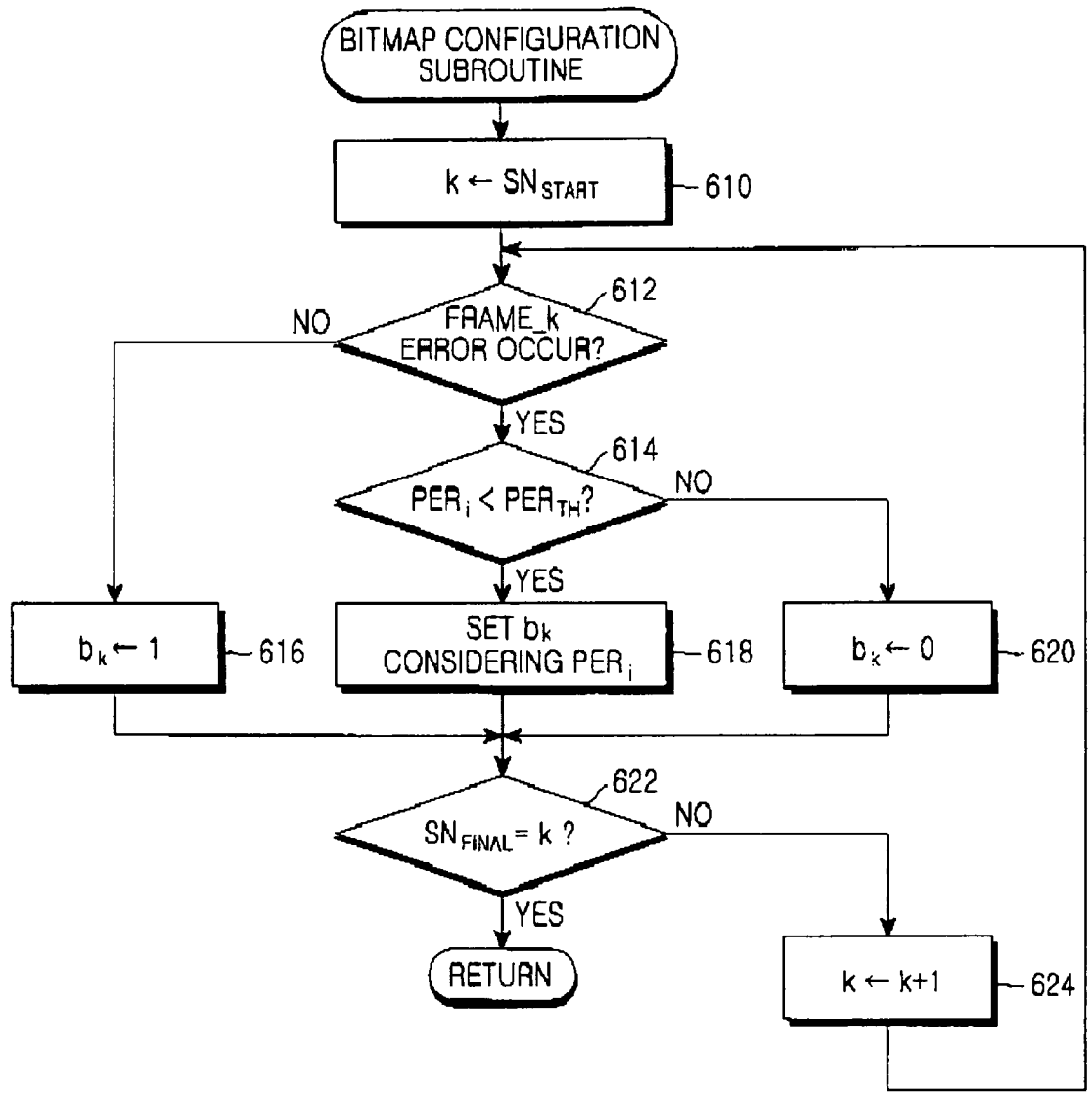
FIG. 6 is a flowchart illustrating an example of a control flow according to a bitmap configuration subroutine.
Figure 7:
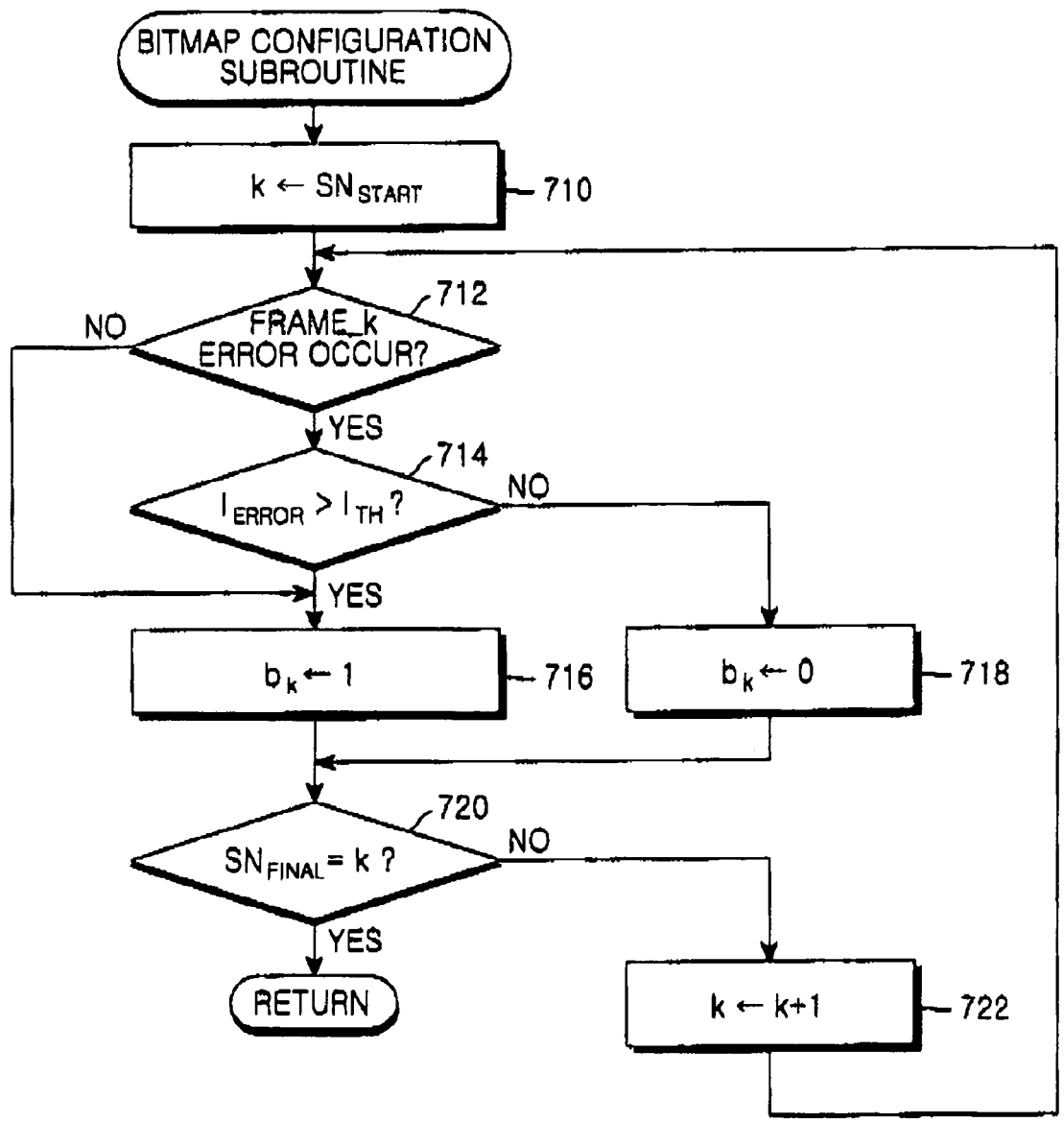
FIG. 7 is a flowchart illustrating another example of a control flow according to a bitmap configuration subroutine.
Figure 8:
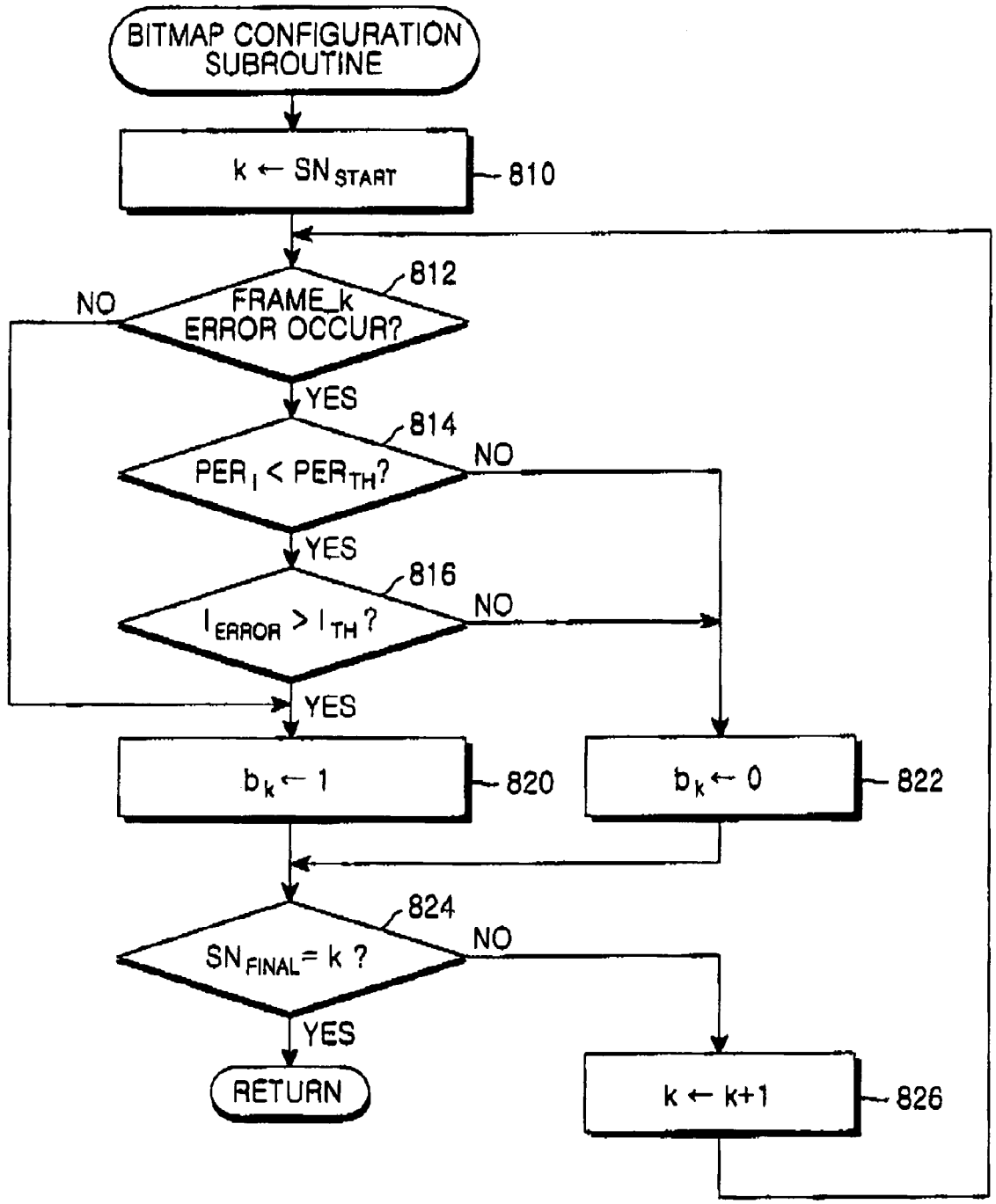
FIG. 8 is a flowchart illustrating still another example of a control flow according to a bitmap configuration subroutine.

FIG. 6 presents an example in which a reception result of a corresponding data frame is determined considering only a current PER, FIG. 7 presents an example in which a reception result of a corresponding data frame is determined considering only an interval between data frames where errors have occurred, and FIG. 8 presents an example in which a reception result of a corresponding data frame is determined considering the current PER as well as the interval between data frames where errors have occurred.

Referring to FIG. 6, in step 610, the AP initially sets k for counting the total number of received data frames to a sequence number of a starting received data frame, $SN_{START}$. $SN_{START}$ indicates a sequence number belonging to a data frame transmitted first from among consecutively received data frames. $SN_{START}$ is included in a previously received block ACK request message.

In step 612, the AP determines if an error has occurred in a k-th received data frame (frame_k). If no error has occurred in the k-th received data frame (frame_k), in step 616, the AP sets an identification bit, $b_k$, corresponding to the k-th received data frame to a positive value (hereinafter defined by "1"). The identification bit $b_k$ is an identification bit representing a reception result of the k-th received data frame. The fact that $b_k$ is set to "1" means success in receiving the corresponding data frame.

If an error has occurred in the k-th received data frame (frame_k), in step 614, the AP determines if current PER, $PER_i$, is lower than a threshold PER, $PER_{TH}$. Here, $PER_i$ may be calculated in a sliding window scheme in which PER is calculated by detecting an error having occurred for a given period of time. $PER_{TH}$ is determined by a request parameter (QoS) of a service user, and thus becomes a criterion for estimating the degree of satisfaction of the service user.

If $PER_i$ is lower than $PER_{TH}$, in step 618, the AP sets $b_k$ under the consideration of $PER_i$. That is, when $PER_i$ is significantly higher than $PER_{TH}$, a user experiences inconvenience even if a time delay occurs due to retransmission of the data frame where an error has occurred. Thus, in this case, $b_k$ is set to a negative value (hereinafter defined by "0"). However, otherwise $b_k$ is set to "1" on the assumption that the erroneous data frame has been successfully received. This is because it is considered that a user is not inconvenienced even if he/she does not receive the erroneous data frame.

If $PER_i$ is greater than or equal to $PER_{TH}$, in step 620, the AP sets $b_k$ to "0". This is because it is considered that a user is inconvenienced when the erroneous data frame is assumed as being normally received.

If the setting of $b_k$ equivalent to the reception result for the k-th received data frame is completed, in step 622, the AP determines if configuring a bitmap based on reception results for all the received data frames is completed. This may be accomplished by comparing k with a sequence number belonging to a data frame finally received from among the received data frames, $SN_{FINAL}$. As an example, when k is equal to $SN_{FINAL}$, it is determined that configuring a bitmap is completed.

If k is not equal to $SN_{FINAL}$, in step 624, the AP increases k by one, and then repeatedly performs steps 612 to 622 to thereby set an identification bit for the next received data frame.

If k is equal to $SN_{FINAL}$, the AP completes configuring a bitmap for the received data frames.

As stated above, the embodiment illustrated in FIG. 6 is characterized in that although an error has occurred in a data frame, a bitmap is configured on the assumption that the data frame has been successfully received considering a current PER, so long as the current PER is lower than the threshold PER.

Referring to FIG. 7, in step 710, the AP initially sets k for counting the total number of received data frames to a sequence number of a starting received data frame, $SN_{START}$. $SN_{START}$ indicates a sequence number belonging to a data frame transmitted first from among consecutively received data frames. $SN_{START}$ is included in a previously received block ACK request message.

In step 712, the AP determines if an error has occurred in a k-th received data frame (frame_k). If no error has occurred in the k-th received data frame (frame_k), in step 716, the AP sets an identification bit, $b_k$, corresponding to the k-th received data frame to "1". The identification bit, $b_k$, is an identification bit representing a reception result of the k-th received data frame. The fact that $b_k$ is set to "1" means success in receiving the corresponding data frame.

If an error has occurred in the k-th received data frame (frame_k), in step 714, the AP determines if an interval between erroneous data frames, $I_{ERROR}$, is greater than a threshold value, $I_{TH}$. Here, $I_{ERROR}$ is an interval from a data frame where an error has previously occurred to a data frame where an error newly occurs. In addition, $I_{TH}$ is determined by an interval between data frames, within which, in view of a request parameter (QoS) of a service user, the user is not inconvenienced even if he/she does not receive the data frame. Thus, $I_{TH}$ is used as a threshold value for estimating a character in which errors consecutively occur. The interval may be defined as an error value of a sequence number belonging to a data frame.

If $I_{ERROR}$ is greater than $I_{TH}$, in step 716, the AP sets an identification bit, $b_k$, corresponding to the k-th received data frame to "1". This is because it is considered that a user is not inconvenienced even if he/she does not receive the data frame.

If $I_{ERROR}$ is less than or equal to $I_{TH}$, in step 718, the AP sets $b_k$ to "0". This is because the error for the data frame has occurred at an interval where a user is inconvenienced. That is, when an error for a data frame has consecutively occurred to the extent that a user is inconvenienced, retransmission of the corresponding data frame is requested to a recipient.

If the setting of $b_k$ equivalent to the reception result for the k-th received data frame is completed, in step 720, the AP determines if configuring a bitmap based on reception results for all the received data frames is completed. This may be accomplished by comparing k with a sequence number belonging to a data frame finally received from among the received data frames, $SN_{FINAL}$. As an example, when k is equal to $SN_{FINAL}$, it is determined that configuring a bitmap is completed.

If k is not equal to $SN_{FINAL}$, in step 722, the AP increases k by one, and then repeatedly performs steps 712 to 720 to thereby set an identification bit for the next received data frame.

If k is equal to $SN_{FINAL}$, the AP completes configuring a bitmap for the received data frames.

As stated above, the embodiment illustrated in FIG. 7 is characterized in that although an error has occurred in a data frame, a bitmap is configured on the assumption that the data frame has been successfully received, so long as an interval between erroneous data frames is greater than a threshold value. That is, a data frame where an error has occurred at an interval greater than a predetermined interval is regarded as having been successfully received, so that a time delay, which may be caused by retransmission, can be minimized.

Referring to FIG. 8, in step 810, the AP initially sets k for counting the total number of received data frames to a sequence number of a starting received data frame, $SN_{START}$. $SN_{START}$ indicates a sequence number belonging to a data frame transmitted first from among consecutively received data frames. $SN_{START}$ is included in a previously received block ACK request message.

In step 812, the AP determines if an error has occurred in a k-th received data frame (frame_k). If no error has occurred in the k-th received data frame (frame_k), in step 820, the AP sets an identification bit, $b_k$, corresponding to k-th received data frame to "1". The identification bit, $b_k$, is an identification bit representing a reception result of the k-th received data frame. The fact that $b_k$ is set to "1" means success in receiving the corresponding data frame.

If an error has occurred in the k-th received data frame (frame_k), in step 814, the AP determines if a current PER, $PER_i$, is lower than a threshold PER, $PER_{TH}$. Here, $PER_i$ may be calculated in a sliding window scheme in which PER is calculated by detecting an error having occurred for a given period of time. $PER_{TH}$ is determined by a request parameter (QoS) of a service user, and thus becomes a criterion for estimating the degree of satisfaction of the service user.

If $PER_i$ is greater than or equal to $PER_{TH}$, in step 822, the AP sets $b_k$ to "0". This is because it is considered that a user is inconvenienced when the erroneous data frame is assumed as being normally received.

However, if $PER_i$ is lower than $PER_{TH}$, it is necessary to define the reception result according to another condition. Thus, in this case, the AP goes to step 816 to determine if an interval between erroneous data frames, $I_{ERROR}$, is greater than a threshold value, $I_{TH}$. Here, $I_{ERROR}$ is an interval from a data frame where an error has previously occurred to a data frame where an error newly occurs. In addition, $I_{TH}$ is determined by an interval between data frames, within which, in view of a request parameter (QoS) of a service user, the user is not inconvenienced even if he/she does not receive the data frame. Thus, $I_{TH}$ is used as a threshold value for estimating a character in which errors consecutively occur. The interval may be defined as an error value of a sequence number belonging to a data frame.

If $I_{ERROR}$ is greater than $I_{TH}$, in step 820, the AP sets an identification bit, $b_k$, corresponding to the k-th received data frame to "1". This is because it is considered that a user is not inconvenienced even if he/she does not receive the data frame.

If $I_{ERROR}$ is less than or equal to $I_{TH}$, in step 822, the AP sets $b_k$ to "0". This is because the error for the data frame has occurred at an interval where a user is inconvenienced. That is, when an error for a data frame has consecutively occurred to the extent that a user is inconvenienced, retransmission of the corresponding data frame is requested to a recipient.

If the setting of $b_k$ equivalent to the reception result for the k-th received data frame is completed, in step 824, the AP determines if configuring a bitmap based on reception results for all the received data frames is completed. This may be accomplished by comparing k with a sequence number belonging to a data frame finally received from among the received data frames, $SN_{FINAL}$. As an example, when k is equal to $SN_{FINAL}$, it is determined that configuring a bitmap is completed.

If k is not equal to $SN_{FINAL}$, in step 826, the AP increases k by one, and then repeatedly performs steps 812 to 824 to thereby set an identification bit for the next received data frame.

If k is equal to $SN_{FINAL}$, the AP completes configuring a bitmap for the received data frames.

As stated above, the embodiment illustrated in FIG. 8 is characterized in that although an error has occurred in a data frame, a reception result for a data frame is newly defined by a current PER and an interval between erroneous data frames. That is, when the current PER is lower than the threshold PER, and the interval between erroneous data frames is greater than a threshold value, a bitmap is configured on the assumption that the data frame has been successfully received.

Meanwhile, if a bitmap is finally configured through any of the subroutines in FIGS. 6, 7 and 8, the AP goes to step 516 of the main routine in FIG. 5. In step 516, the AP transmits the configured bitmap to the STA through a block ACK frame.

Figure 9:
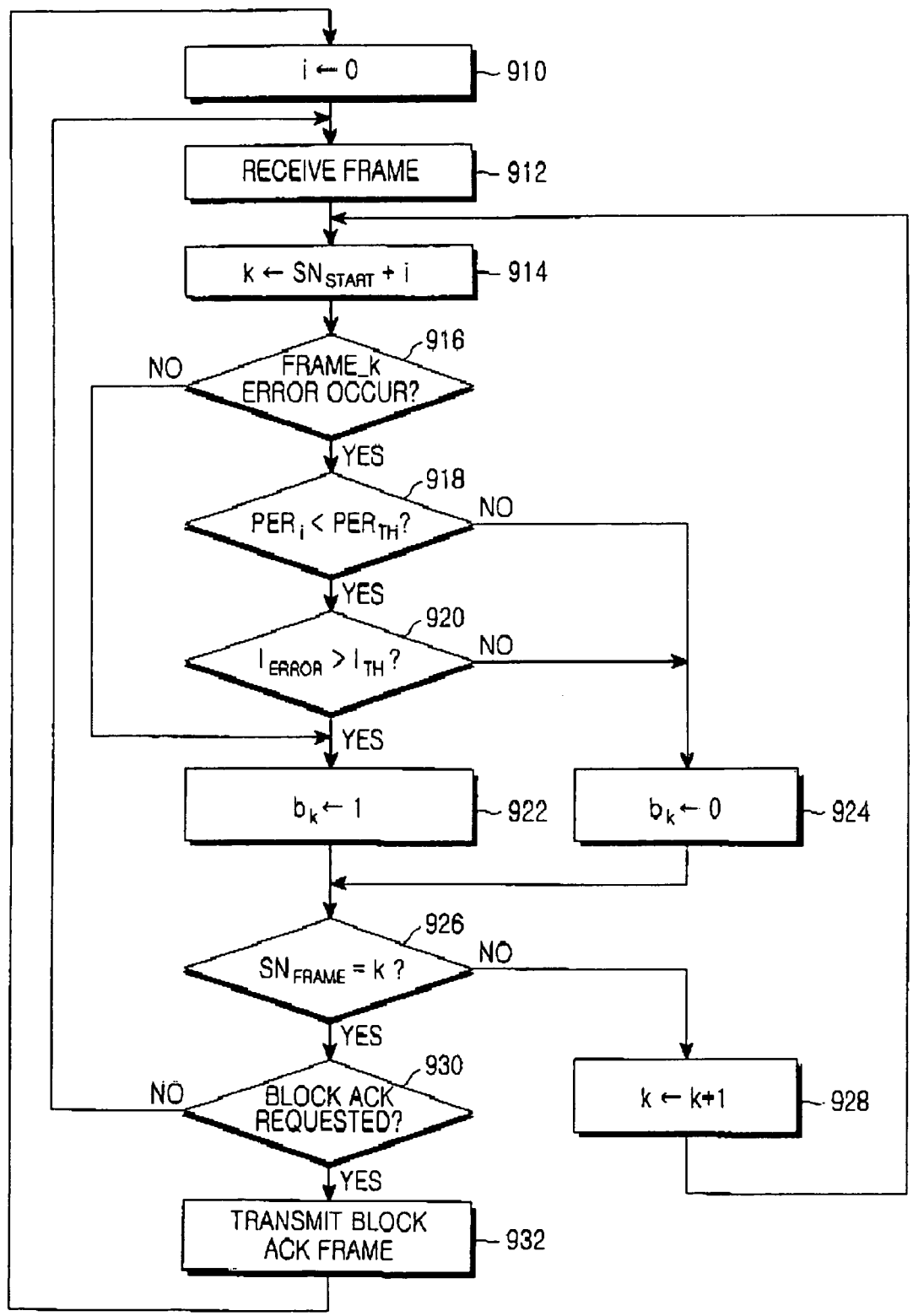
FIG. 9 is a flowchart illustrating a control flow for generating a block ACK bitmap in accordance with a second embodiment of the present invention.

FIG. 9 illustrates a control flow in an AP according to another preferred embodiment of the present invention, in which identification bits corresponding to reception results of data frames are previously determined at a point of time when the data frames are received, and then a bitmap is configured by the predetermined identification bits when a block ACK request is received. Here, it is preferred that the AP is previously aware of a sequence number of a data frame transmitted first among other data frames. Therefore, in the following description, it will be assumed that the AP can confirm the sequence number of the first received data frame.

Referring to FIG. 9, in step 910, the AP sets i to 0. Here, i is a value for determining a sequence number of a data frame that is expected to be received. The reason i is used is that when sequence numbers of received data frames are not consecutive, identification bits corresponding to data frames having omitted sequence numbers can be set by use of i. The omission of the sequence number may be caused by data frame loss due to a hindrance on a reception channel of the data frame according to retransmission.

In step 912, the AP receives a data frame. In step 914, the AP sets k to i added to a sequence number of the first transmitted data frame, $SN_{START}$. Here, k is a sequence number of a data frame that is expected to be received. Thus, if there has occurred no retransmission or loss, a sequence number of the received data frame would be equal to be k. Also, when the data frame is received first, k is set to $SN_{START}$.

In step 916, the AP determines if an error has occurred in a k-th received data frame (frame_k). If no error has occurred in the k-th received data frame (frame_k), in step 922, the AP sets an identification bit, $b_k$, corresponding to k-th received data frame to "1". The identification bit, $b_k$, is an identification bit representing a reception result of the k-th received data frame. The fact that $b_k$ is set to "1" means success in receiving the corresponding data frame.

If an error has occurred in the k-th received data frame (frame_k), in step 918, the AP determines if a current PER, $PER_i$, is lower than a threshold PER, $PER_{TH}$. Here, $PER_i$ may be calculated in a sliding window scheme in which PER is calculated by detecting an error having occurred for a given period of time. $PER_{TH}$ is determined by a request parameter (QoS) of a service user, and thus becomes a criterion for estimating the degree of satisfaction of the service user.

If $PER_i$ greater than or is equal to $PER_{TH}$, in step 924, the AP sets $b_k$ to "0". This is because it is considered that a user is inconvenienced when the erroneous data frame is assumed as being normally received.

However, if $PER_i$ is lower than $PER_{TH}$, it is necessary to define the reception result according to another condition. Thus, in this case, the AP goes to step 920 to determine if an interval between erroneous data frames, $I_{ERROR}$, is greater than a threshold value, $I_{TH}$. Here, $I_{ERROR}$ is an interval from a data frame where an error has previously occurred to a data frame where an error newly occurs. In addition, $I_{TH}$ is determined by an interval between data frames, within which, in view of a request parameter (QoS) of a service user, the user is not inconvenienced even if he/she does not receive the data frame. Thus, $I_{TH}$ is used as a threshold value for estimating a character in which errors consecutively occur. The interval may be defined as an error value of a sequence number belonging to a data frame.

If $I_{ERROR}$ is greater than $I_{TH}$, in step 922, the AP sets an identification bit, $b_k$, corresponding to the k-th received data frame to "1". This is because it is considered that a user is not inconvenienced even if he/she does not receive the data frame.

If $I_{ERROR}$ is less than or equal to $I_{TH}$, in step 924, the AP sets $b_k$ to "0". This is because the error for the data frame has occurred at an interval where a user is inconvenienced. That is, when an error for a data frame has consecutively occurred to the extent that a user is inconvenienced, retransmission of the corresponding data frame is requested to a recipient.

If the setting of $b_k$ equivalent to the reception result for the k-th received data frame is completed, in step 926, the AP determines if configuring a bitmap based on reception results for all the received data frames is completed. This may be accomplished by comparing k with a sequence number belonging to a previously received data frame, $SN_{FRAME}$. If k is equal to $SN_{FRAME}$, it can be regarded that an identification bit is set based on a reception result of the received data frame. However, if k is not equal to $SN_{FRAME}$, it can be regarded that an identification bit corresponding to a reception result of an omitted data frame is set. In this case, the AP goes to step 928 to increase i by one, and repeatedly perform steps 914 to 926.

If the setting of an identification bit corresponding to the reception result of the received data frame is completed, in step 930, the AP checks if a block ACK request is received from the STA. If the block ACK request is not received, in step 912, the AP receives a new data frame, and sets an identification bit corresponding to a reception result of the received data frame through steps 914 to 926.

Otherwise, if the block ACK request is received, in step 932, the AP configures a bitmap by identification bits previously set according to the respective received data frames, and transmits the configured bitmap to the STA through a block ACK. After transmitting the block ACK, the AP goes to step 910 to configure a bitmap based on a newly received data frame until a next block ACK request is received.

C. Example of Configuring Bitmap

Hereinafter, a detailed description will be given for examples of configuring a bitmap according to a reception result of data frames with reference to the accompanying drawings.

In the present invention, a bitmap for a block ACK is adjusted according to a current PER. For example, when the current PER is higher than a threshold value, the bitmap is configured to be the same as the existing bitmap because a user may be inconvenienced due to frame loss, and thus the frame loss needs to be reduced. However, when the current PER is lower than the threshold value, the bitmap is configured on the assumption that an erroneous frame has been successfully received, so long as a user is not inconvenienced.

Figure 10A:
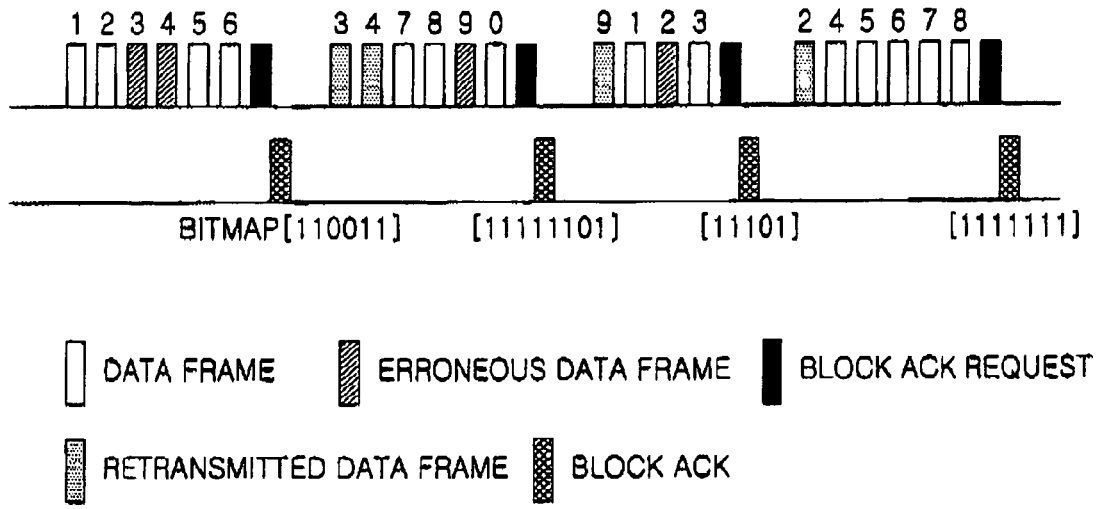
FIGS. 10A and 10B are views illustrating an example of reporting a reception result of packets in accordance with of the present invention.

FIG. 10A illustrates a scheme of adjusting a bitmap for a block ACK when a current PER is higher than a threshold value.

Referring to FIG. 10A, an originator consecutively transmits six data frames at the first transmission. At this time, the transmitted data frames have sequence numbers of 1, 2, 3, 4, 5 and 6, respectively. Also, it is assumed that errors have occurred in the data frame having a sequence number of 3 and the data frame having a sequence number of 4, from among the six data frames. In addition, after consecutively transmitting the six data frames, the originator transmits a block ACK request message requesting a reception result of the data frames. In the block ACK request message, a starting sequence number is set to "1".

If receiving the block ACK request message, a recipient configures a bitmap based on a reception result for each of the six data frames. As the reception result of each data frame can be expressed by 1 bit, the bitmap is configured with identification bits of 6 bits. The identification bit constituting the bitmap is set to "0" in the case of failure in receiving the corresponding data frame, and is set to "1" in the case of success in receiving the corresponding data frame. Thus, identification bits corresponding to the data frames where no error has occurred (the data frames having sequence numbers of 1, 2, 5 and 6, respectively) are set to "1" in the bitmap. However, identification bits corresponding to the data frames where errors have occurred (the data frames having sequence numbers of 3 and 4, respectively) are set to "0" in the bitmap.

As a result of this, a bitmap corresponding to the first six transmitted data frames is configured as "110011". The recipient transmits the configured bitmap to the originator through a block ACK message.

The originator consecutively transmits six data frames at the second transmission. At this time, the transmitted data frames have sequence numbers of 3, 4, 7, 8, 9 and 0, respectively. Of the six data frames, the data frame having a sequence number of 3 and the data frame having a sequence number of 4 are retransmitted data frames. Also, it is assumed that an error has occurred in the data frame having a sequence number of 9. In addition, after consecutively transmitting the six data frames, the originator transmits a block ACK request message requesting a reception result of the data frames. In the block ACK request message, a starting sequence number is set to "3".

If receiving the block ACK request message, the recipient configures a bitmap based on a reception result for each of the six data frames. The bitmap is configured with identification bits of 8 bits. This is because it is required to additionally transmit identification bits for omitted data frames, which have not been transmitted at the second transmission, but a reception result thereof must be reported. The omitted data frames are defined as data frames which have already been normally received at the preceding transmission. Here, the omitted data frames are data frames having sequence numbers of 5 and 6, respectively.

Identification bits corresponding to the data frames where no error has occurred are set to "1" in the bitmap. The data frames where no error has occurred include the omitted data frames of sequence numbers 5 and 6 as well as the data frames having sequence numbers of 3, 4, 7, 8 and 0, respectively. However, an identification bit corresponding to the data frame where an error has occurred (the data frame having a sequence number of 9) is set to "0" in the bitmap.

As a result of this, a bitmap corresponding to the second six transmitted data frames is configured as "11111101". The recipient transmits the configured bitmap to the originator through a block ACK message.

The originator consecutively transmits four data frames at the third transmission. At this time, the transmitted data frames have sequence numbers of 9, 1, 2 and 3, respectively. Of the four data frames, the data frame having a sequence number of 9 is a retransmitted data frame. Also, it is assumed that an error has occurred in the data frame having a sequence number of 2. In addition, after consecutively transmitting the four data frames, the originator transmits a block ACK request message requesting a reception result of the data frames. In the block ACK request message, a starting sequence number is set to "9".

If receiving the block ACK request message, the recipient configures a bitmap based on a reception result for each of the four data frames. The bitmap is configured with identification bits of 5 bits. This is because it is required to additionally transmit an identification bit for an omitted data frame, which has not been transmitted at the third transmission, but a reception result thereof must be reported. Here, the omitted data frame is the data frame having a sequence number of 0. Identification bits corresponding to the data frames where no error has occurred are set to "1" in the bitmap. The data frames where no error has occurred include the omitted data frame of sequence number 0 as well as the data frames having sequence numbers of 9, 1 and 3, respectively. However, an identification bit corresponding to the data frame where an error has occurred (the data frame having a sequence number of 2) is set to "0" in the bitmap.

As a result of this, a bitmap corresponding to the third four transmitted data frames is configured as "11101". The recipient transmits the configured bitmap to the originator through a block ACK message.

The originator consecutively transmits six data frames at the fourth transmission. At this time, the transmitted data frames have sequence numbers of 2, 4, 5, 6, 7 and 8, respectively. Of the six data frames, the data frame having a sequence number of 2 is a retransmitted data frame. Also, it is assumed that no error has occurred in the six data frames. In addition, after consecutively transmitting the six data frames, the originator transmits a block ACK request message requesting a reception result of the data frames. In the block ACK request message, a starting sequence number is set to "2".

If receiving the block ACK request message, the recipient configures a bitmap based on a reception result for each of the six data frames. The bitmap is configured with identification bits of 7 bits. This is because it is required to additionally transmit an identification bit for an omitted data frame, which has not been transmitted at the fourth transmission, but a reception result thereof must be reported. Here, the omitted data frame is the data frame having a sequence number of 3.

Identification bits corresponding to the data frames where no error has occurred are set to "1" in the bitmap. The data frames where no error has occurred include the omitted data frame of sequence number 3 as well as the data frames having sequence numbers of 2, 4, 5, 6, 7 and 8, respectively.

As a result of this, a bitmap corresponding to the fourth six transmitted data frames is configured as "1111111". The recipient transmits the configured bitmap to the originator through a block ACK message.

Figure 10B:
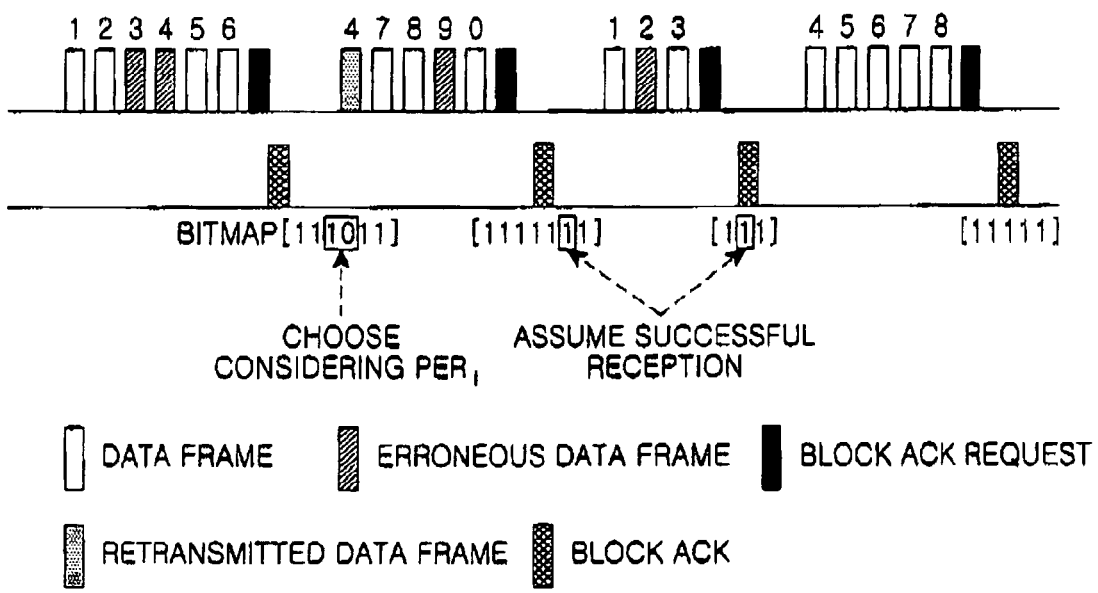

FIG. 10B illustrates a scheme of adjusting a bitmap for a block ACK when a current PER is lower than a threshold value.

Referring to FIG. 10B, an originator consecutively transmits six data frames at the first transmission. At this time, the transmitted data frames have sequence numbers of 1, 2, 3, 4, 5 and 6, respectively. Also, it is assumed that errors have occurred in the data frame having a sequence number of 3 and the data frame having a sequence number of 4, from among the six data frames. In addition, after consecutively transmitting the six data frames, the originator transmits a block ACK request message requesting a reception result of the data frames. In the block ACK request message, a starting sequence number is set to "1".

If receiving the block ACK request message, a recipient configures a bitmap based on a reception result for each of the six data frames. An identification bit constituting the bitmap is set to "1" when the corresponding data frame has been successfully received, but is set to "1" or "0" according to circumstances when the corresponding data frame has been unsuccessfully received. Thus, identification bits corresponding to the data frames where no error has occurred (the data frames having sequence numbers of 1, 2, 5 and 6, respectively) are set to "1" in the bitmap. However, identification bits corresponding to the data frames where errors have occurred (the data frames having sequence numbers of 3 and 4, respectively) are set according to circumstances (considering $PER_t$) in the bitmap. The data frame having a sequence number of 3 is regarded as having been successfully received, and thus an identification bit corresponding thereto is set to "1". However, the data frame having a sequence number of 4 cannot be regarded as having been successfully received. This is because two consecutive data frames (the data frames having sequence numbers of 3 and 4, respectively) are not received when the data frame having a sequence number of 4 is regarded as having been successfully received. If the two data frames are not received in this way, a user may be inconvenienced. Therefore, the data frame having a sequence number of 4 is set to "0" in order to request retransmission thereof.

As a result of this, a bitmap corresponding to the first six transmitted data frames is configured as "1111" by means of the proposed inventive method whereas it is to be configured as "1111" in the conventional method. Also, the recipient transmits the configured bitmap to the originator through a block ACK message.

The originator consecutively transmits five data frames at the second transmission. At this time, the transmitted data frames have sequence numbers of 4, 7, 8, 9 and 0, respectively. Of the five data frames, the data frame having a sequence number of 4 is a retransmitted data frame. Also, it is assumed that an error has occurred in the data frame having a sequence number of 9. In addition, after consecutively transmitting the five data frames, the originator transmits a block ACK request message requesting a reception result of the data frames. In the block ACK request message, a starting sequence number is set to "4".

If receiving the block ACK request message, the recipient configures a bitmap based on a reception result for each of the five data frames. The bitmap is configured with identification bits of 7 bits. This is because it is required to additionally transmit identification bits for omitted data frames, which has not been transmitted at the third transmission, but a reception result thereof must be reported. Here, the omitted data frames are the data frame having sequence numbers of 5 and 6, respectively.

Identification bits corresponding to the data frames where no error has occurred are set to "1" in the bitmap. The data frames where no error has occurred include the omitted data frames of sequence numbers 5 and 6 as well as the data frames having sequence numbers of 4, 7, 8 and 0, respectively. An identification bit corresponding to the data frame where an error has occurred (the data frame having a sequence number of 9) is also set to "1" in the bitmap. This is because it is considered that a user is not inconvenienced even if he/she does not receive the data frame having a sequence number of 9.

As a result of this, a bitmap corresponding to the second five transmitted data frames is configured as "111111" by means of the proposed inventive method whereas it is to be configured as "111111" in the conventional method. Also, the recipient transmits the configured bitmap to the originator through a block ACK message.

The originator consecutively transmits three data frames at the third transmission. At this time, the transmitted data frames have sequence numbers of 1, 2 and 3, respectively. It is assumed that an error has occurred in the data frame having a sequence number of 2, from among the three data frames. In addition, after consecutively transmitting the three data frames, the originator transmits a block ACK request message requesting a reception result of the data frames.

If receiving the block ACK request message, the recipient configures a bitmap based on a reception result for each of the three data frames. The bitmap is configured with identification bits of 3 bits. Here, since there is no omitted data frame, the number of the received data frames is equal to the number of the bits constituting the bitmap.

Identification bits corresponding to the data frames where no error has occurred are set to "1" in the bitmap. The data frames where no error has occurred are the data frames having sequence numbers of 1 and 3, respectively. An identification bit corresponding to the data frame where an error has occurred (the data frame having a sequence number of 2) is also set to "1" in the bitmap. This is because it is considered that a user is not inconvenienced even if he/she does not receive the data frame having a sequence number of 2.

As a result of this, a bitmap corresponding to the third three transmitted data frames is configured as "11" by means of the proposed inventive method whereas it is to be configured as "11" in the conventional method. Also, the recipient transmits the configured bitmap to the originator through a block ACK message.

The originator consecutively transmits five data frames at the fourth transmission. At this time, the transmitted data frames have sequence numbers of 4, 5, 6, 7 and 8, respectively. It is assumed that no error has occurred in the five data frames. In addition, after consecutively transmitting the five data frames, the originator transmits a block ACK request message requesting a reception result of the data frames.

If receiving the block ACK request message, the recipient configures a bitmap based on a reception result for each of the five data frames. The bitmap is configured with identification bits of 5 bits. Here, since there is no omitted data frame, the number of the received data frames is also equal to the number of the bits constituting the bitmap.

Identification bits corresponding to the data frames where no error has occurred are set to "1" in the bitmap.

As a result of this, a bitmap corresponding to the third three transmitted data frames is configured as "11111". Also, the recipient transmits the configured bitmap to the originator through a block ACK message.

In the foregoing, the number of bits constituting a bitmap is determined correspondingly to the number of data frames to be reported on their reception results. However, it possible to configure a bitmap with a sufficient number of bits, and to transmit the configured bitmap with unused bits being subjected to padding treatment.

As described above, according to a method of the present invention, unnecessary frame transmissions can be reduced by decreasing the number of times of retransmission for traffic insensitive to packet loss. This makes it possible to efficiently use transmission resources, increase transmission capacity, and reduce transmission delay time. Therefore, the method of the present invention is applicable as technology for improving MAC performance when applied to a module supporting a handheld WLAN.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for configuring a bitmap based on a reception result for each of received data frames in a mobile communication system, the method comprising:
   receiving a request message, and in response to the request message, transmitting a message, both the request message and message transmitted in response to the request message including traffic information regarding a traffic type to be transmitted;
   if the traffic type is of one predetermined type, then:
   comparing a current packet error rate caused by a received data frame having been unsuccessfully received from among the received data frames, with a predetermined threshold value; and
   if the current packet error rate is lower than the predetermined threshold value,
   configuring the bitmap assuming that the received data frame has been successfully received,
   wherein the traffic type indicates whether the data frame is insensitive to transmission delay time or not, and
   wherein the receiving, comparing, configuring, or any combination thereof, is performed via a processor.

2. The method as claimed in claim 1, wherein the current packet error rate is calculated in a sliding window scheme.

3. The method as claimed in claim 2, wherein the predetermined threshold value is determined by a request parameter (QoS) of a service user.

4. The method as claimed in claim 1, wherein comparing the current packet error rate with the predetermined threshold value is applied for only the received data frame where the error has occurred.

5. The method as claimed in claim 4, wherein only when an interval between the data frames where errors have occurred is greater than a predetermined threshold value, regardless of whether the packet error rate is lower than the threshold value, the bit map is configured assuming that the received data frame has been successfully received.

6. The method as claimed in claim 1, wherein the request message and message transmitted in response to the request message are transmitted in a Traffic Setup Phase, and the traffic type identified in the information regarding traffic regarding traffic type in the Traffic Setup Phase is transmitted in a Transmission Phase.

7. The method as claimed in claim 1, further comprising:
   if the current packet error rate is lower than the p'redetermined threshold value, and an interval between the received data frames where the error has occurred is greater than a predetermined threshold value, configuring the bitmap assuming that the received data frame has been successfully received.

8. A method for reporting a reception result for each of received data frames using a bitmap in a mobile communication system, the method comprising:
   receiving a request message, and in response to the request message, transmitting a message, both the request message and message transmitted in response to the request message including traffic information regarding a traffic type to be transmitted;
   receiving data frames until a block ACK is requested;
   configuring the bitmap according to the traffic type;
   setting an identification bit of the bitmap, which corresponds to a data frame having been successfully received from among the received data frames, to a positive value;
   calculating a current packet error rate caused by a data frame having been unsuccessfully received from among the received data frames;
   if the current packet error rate is lower than a predetermined threshold value, setting the corresponding identification bit of the bitmap to a positive value;
   if the current packet error rate is greater than or equal to the predetermined threshold value, setting a corresponding identification bit of the bitmap to a negative value; and
   if the setting of the identification bit is completed for the respective received data frames, transmitting the bitmap through a block ACK message,
   wherein if the traffic type indicates whether the data frame is insensitive to the transmission delay time or not, and
   wherein the receiving the request message, receiving the data frames, configuring, setting, calculating, or any combination thereof, is performed via a processor.

9. The method as claimed in claim 8, wherein the current packet error rate is calculated in a sliding window scheme.

10. The method as claimed in claim 9, wherein the predetermined threshold value is determined by a request parameter (QoS) of a service user.

11. The method as claimed in claim 8, wherein the positive value is 1, and the negative value is 0.

12. The method as claimed in claim 8, further comprising:
if an interval between the data frames having been unsuccessfully received is greater than a predetermined threshold value regardless of whether the packet error rate is lower than the threshold value, setting the corresponding identification bit of the bitmap to the negative value.

13. The method as claimed in claim 8, wherein the request message and message transmitted in response to the request message are transmitted in a Traffic Setup Phase, and the type of traffic identified in the information regarding traffic regarding traffic type in the Traffic Setup Phase is transmitted in a Transmission Phase.

14. The method as claimed in claim 8, further comprising:
if the current packet error rate is lower than the predetermined threshold value, and an interval between the received data frames where the error has occurred is greater than a predetermined threshold value, configuring the bitmap assuming that the received data frame has been successfully received.

* * * * *